(12) United States Patent
Rhoads et al.

(10) Patent No.: US 7,444,392 B2
(45) Date of Patent: Oct. 28, 2008

(54) REGISTERING WITH COMPUTER SYSTEMS

(75) Inventors: Geoffrey B. Rhoads, West Linn, OR (US); Brian T. MacIntosh, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 351 days.

(21) Appl. No.: 11/286,146

(22) Filed: Nov. 23, 2005

(65) Prior Publication Data

US 2006/0149843 A1     Jul. 6, 2006

Related U.S. Application Data

(63) Continuation of application No. 09/803,369, filed on Mar. 9, 2001, now Pat. No. 7,051,086, which is a continuation-in-part of application No. 09/314,648, filed on May 19, 1999, now Pat. No. 6,681,028, which is a continuation-in-part of application No. 09/130,624, filed on Aug. 6, 1998, now Pat. No. 6,324,573, which is a continuation of application No. 08/508,083, filed on Jul. 27, 1995, now Pat. No. 5,841,978.

(51) Int. Cl.
*G06F 13/00* (2006.01)

(52) U.S. Cl. .................. 709/219; 709/225; 713/176

(58) Field of Classification Search ............... 709/217, 709/219, 223, 225; 713/201, 176
See application file for complete search history.

(56) References Cited

U.S. PATENT DOCUMENTS

| | | | |
|---|---|---|---|
| 5,221,833 A | 6/1993 | Hecht | |
| 5,646,997 A | 7/1997 | Barton | |
| 5,649,115 A | 7/1997 | Schrader et al. | ............... 705/33 |
| 5,721,788 A | 2/1998 | Powell | |
| 5,761,686 A | 6/1998 | Bloomberg | |
| 5,765,152 A | 6/1998 | Erickson | |
| 5,892,900 A | 4/1999 | Ginter et al. | |
| 5,951,055 A | 9/1999 | Mowry, Jr. | |
| 6,243,480 B1 | 6/2001 | Zhao et al. | |
| 6,286,036 B1 | 9/2001 | Rhoads | |
| 6,324,573 B1 | 11/2001 | Rhoads | |
| 6,411,725 B1 | 6/2002 | Rhoads | |
| 6,421,070 B1 | 7/2002 | Ramos | |
| 6,560,349 B1 | 5/2003 | Rhoads | |
| 6,650,761 B1 | 11/2003 | Rodriguez et al. | |
| 6,692,359 B1 | 2/2004 | Williams et al. | .............. 463/42 |
| 6,829,368 B2 | 12/2004 | Meyer et al. | |
| 6,978,036 B2 | 12/2005 | Alattar | |
| 7,043,052 B2 | 5/2006 | Rhoads | |
| 7,095,871 B2 | 8/2006 | Jones et al. | |
| 7,111,170 B2 | 9/2006 | Rhoads | |
| 7,239,734 B2 | 7/2007 | Alattar et al. | |
| 2005/0058319 A1 | 3/2005 | Rhoads et al. | |
| 2005/0091268 A1 | 4/2005 | Meyer | |

*Primary Examiner*—Viet Vu (57) ABSTRACT

In one implementation of the present invention, a method is provided including: receiving a request to register with an online computer; receiving account holder information to register with the online central computer; establishing an account using at least the account holder received information including establishing a user-login that is associated with the account; allowing an account holder to select a graphic or image from a gallery of graphics or images maintained by the online computer, wherein a selected graphic or image becomes a representation that is associated with the account or user-login; and providing a selected graphic or image from the online computer as a representation of association with at least one of the account holder, account and user-login.

14 Claims, 3 Drawing Sheets

REGISTERING WITH COMPUTER SYSTEMS

RELATED APPLICATION DATA

This patent application is a continuation of U.S. patent application Ser. No. 09/803,369, filed Mar. 9, 2001 now U.S. Pat. No. 7,051,086. The Ser. No. 09/803,369 application is a continuation-in-part of assignee's U.S. patent application Ser. No. 09/314,648, filed May 19, 1999 (now U.S. Pat. No. 6,681,028), which is a continuation-in-part of U.S. patent application Ser. No. 09/130,624, filed Aug. 6, 1998 (now U.S. Pat. No. 6,324,573), which is a continuation of U.S. patent application Ser. No. 08/508,083, filed Jul. 27, 1995 (now U.S. Pat. No. 5,841,978, issued Nov. 24, 1998). Each of these patent documents is hereby incorporated by reference.

The subject matter of this application is generally related to that in the assignee's U.S. Pat. Nos. 5,841,886, 5,832,119, 5,822,446 and 5,841,978, and assignee's copending U.S. patent application Ser. No. 09/343,104, filed Jun. 29, 1999, and Ser. No. 09/571,422, filed May 15, 2000 (now U.S. Pat. No. 6,947,571). Each of these patent documents is hereby incorporated by reference.

FIELD OF THE INVENTION

The present invention relates to use of printed documents to control computer systems. Exemplary documents include business cards, stationary, envelopes, résumés, stickers, brochures, advertisements, and identification badges, but the invention is not so limited.

BACKGROUND AND SUMMARY OF THE INVENTION

Over the past century, business cards have formed part of business ritual. Functionally, they serve as a record of an encounter, and provide details of how the giver may be contacted (address, phone, e-mail, etc.).

Essentially, business cards have not changed in response to the advent of computers. Some accommodation has been made for business cards on the computer side, in the form of specialized scanner and optical character recognition (OCR) tools, by which textual data printed on cards can be read and entered into personal productivity software tools (e.g. contact managers, address books, datebooks, personal information managers, etc.). However, the data transferred into the personal productivity software is static and unchanging.

In accordance with one embodiment of the present invention, the graphical, background and/or textual information on a business card are supplemented with steganographically-encoded, multi-bit binary data. When presented to a compliant sensing computer or device, the card serves as an associated link to access further, related information. The information may be maintained in an on-line database at an internet site. Through the database, the recipient of the card may gain access to information that changes over time (e.g., contact information, personal data, job title, etc.).

The foregoing and additional features and advantages of the present invention will be more readily apparent from the following detailed description, which proceeds with reference to the accompanying drawings.

DETAILED DESCRIPTION

Digital watermarking is a quickly growing field of endeavor, and many techniques are known. Generally, all seek to steganographically convey multi-bit data ancillary to some other signal or medium.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The detector component analyzes a suspect signal to detect whether a watermark is present. In applications where the watermark encodes information, the reader component extracts this information from the detected watermark.

The present assignee's prior application Ser. No. 09/127,502, filed Jul. 31, 1998 (now U.S. Pat. No. 6,345,104), shows techniques by which very fine lines can be printed on a medium to slightly change the medium's apparent tint, while also conveying digital data. Commonly owned application Ser. No. 09/074,034, filed May 6, 1998 (now U.S. Pat. No. 6,449,377), details how the contours of printed imagery can be adjusted to convey digital data. (That technique can be applied to printed text characters, as well as the line art imagery particularly considered.). Assignee's U.S. Pat. No. 5,850,481 details how the surface of paper or other media can be textured to convey optically-detectable binary data. The Assignee's U.S. Pat. Nos. 5,841,886, 5,809,160, and the priority applications cited above, detail various techniques for steganographically encoding.

Three papers by Brassil et al show other techniques for conveying watermark data by slight changes to printed text, "Electronic Marking and Identification Techniques to Discourage Document Copying," Proceedings of INFOCOM '94 Conference on Computer, IEEE Comm. Soc Conference, Jun. 12-16, 1994, pp. 1278-1287; "Hiding Information in Document Images," November, 1995, 7 pages, AT&T Bell Laboratories Technical Report; and "Document Marking and Identification using Both Line and Word Shifting," INFOCOM '95.

The foregoing is just a sampling of the large literature on watermarking. The artisan is presumed to be familiar with such art, all of which is generally suitable for use with the novel implementations detailed below.

Linking to a Card-Giver's Information

In accordance with any of the known watermarking techniques, a business card is steganographically encoded with plural bit data. In one embodiment, at least part of this data identifies an internet address or web site at which data about the giver of the card is stored. If sufficient bits can be encoded into the business card, ASCII or binary numeric encoding can encode the address literally. Alternatively, to reduce the data payload, an abbreviated form of an address is encoded. One example of such an abbreviated form is a Unique Identifier (UID), which can be, e.g., a 24-bit value.

Desirably, the steganographic encoding is tailored to facilitate decoding in the presence of arbitrary rotation or scale distortion of the card introduced during scanning. (Some such techniques are shown, e.g., in applicant's related patents identified above. Of course, other techniques are known to those skilled in the art, and such techniques may be employed with the present invention.).

Figure 1:
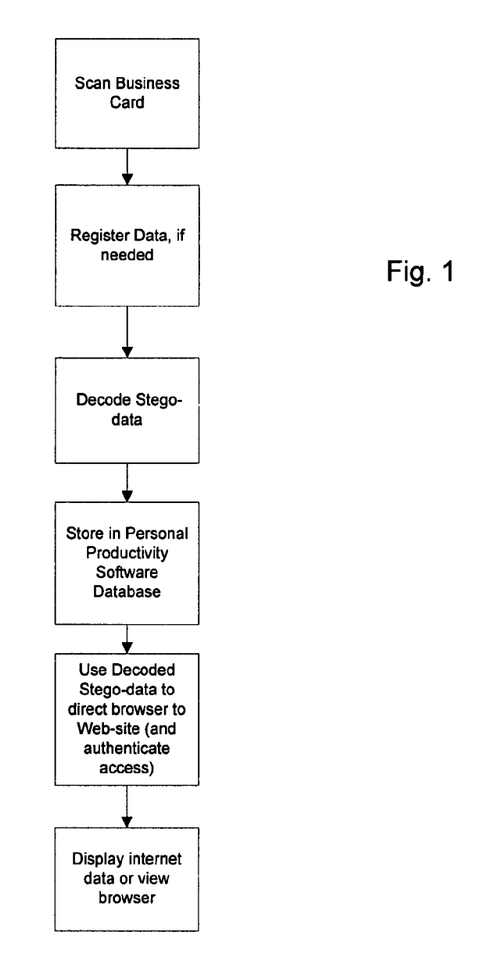
FIG. 1 shows a flow chart of a process according to one embodiment of the present invention.

As shown in FIG. 1, the card is scanned (e.g., by use of conventional opto-electronic devices, such as a business card reader, scanner, web cam or other sensing device). The output data is then optionally processed to account for any skew or scale factor. The plural-bit digital data is then decoded and/or stored, e.g., in personal productivity software.

(Although not particularly shown in FIG. 1, the detailed process may often be supplemental to known OCR-reading of business cards, and entry of the textual data into personal productivity software. That is, the scan data may be processed both by OCR techniques, and by steganographic decoding techniques, and the results of both operations may be selectively stored in a data structure or other memory for later reference.).

The steganographically-decoded plural-bit data is provided to a web browser or other internet appliance and used to initiate a link to a remote computer over the internet's network of computers. If the remote address was literally encoded in the business card, that address is used directly. If an abbreviated form of address was encoded, an additional step may be required.

If a UID was encoded in the card, rather than a literal address, the web browser might consult an index to correlate the UID to an address. The index could be a table or other data structure stored on the user's local computer, but more commonly is a remote name server database to which the browser links as a default when processing business card UIDs. Data obtained from the index is then used to complete the linking to the ultimate destination—e.g., a web site associated with the card-giver. (In addition to reducing the business card payload, such linking through an index, e.g., by a UID, offers flexibility in that the ultimate destination can be moved to other server sites as needed, with just a simple update to the index. Alternatively, all business cards encoded with the former address would be rendered obsolete if the site were relocated.)

At the ultimate site, in one embodiment, the card-recipient is presented with whatever information the business card giver chooses to provide, including biographical information, photos, promotional offers or advertisements relating to the card-giver's business (or relating to enterprises to whom the card-giver has rented screen space), etc., etc. In one embodiment, the giver's site is linked to the giver's personal productivity tool(s) and permits viewing, e.g., of calendar information (showing where the business card giver is scheduled to be today, or for the rest of the week, month, etc.)

Typically, this calendar information is not available to casual web browsers; the steganographically decoded data from the business card may include some authentication data (akin to a password) that permits access to otherwise restricted data. This authentication data can take the form of a web page address to which no publicly-accessible link points, a password that is separately presented to the web server by the user's browser after a link is established, or other known technique.

In one form of the invention, the giver of business cards may have several differently-encoded cards, each with a different level of access authorization. Thus, some cards may access a biographical page without any calendar information, other cards may access the same or different page with access enabled to today's calendar, and still other cards may access the same or different page with access enabled for the card-giver's complete calendar. In another form of the invention, a single card is used with all recipients, yet provides different recipients with different levels of access. This may be done, for example, by providing the most limited form of access to all recipients. If a recipient desires more information, he can enter supplemental information (e.g., a name, email address, phone number or other information) that identifies him or her. The giver of the business card can pre-authorize certain identified individuals to receive different levels of access (e.g., by setting permission levels in a calendary program or otherwise). Based on the supplemental information entered by the user, a commensurate level of access is granted. (A great variety of other ways of granting different permissions can naturally be used; the foregoing just illustrates a range of possibilities.)

System Implementation—Including an On-line Database

An illustrative system 10 is now described with reference to FIGS. 2 and 3. System 10 facilitates registration, the obtaining (or accounting of) unique identifiers, and access to additional data stored in an on-line database via the watermarked business card.

Figure 2:
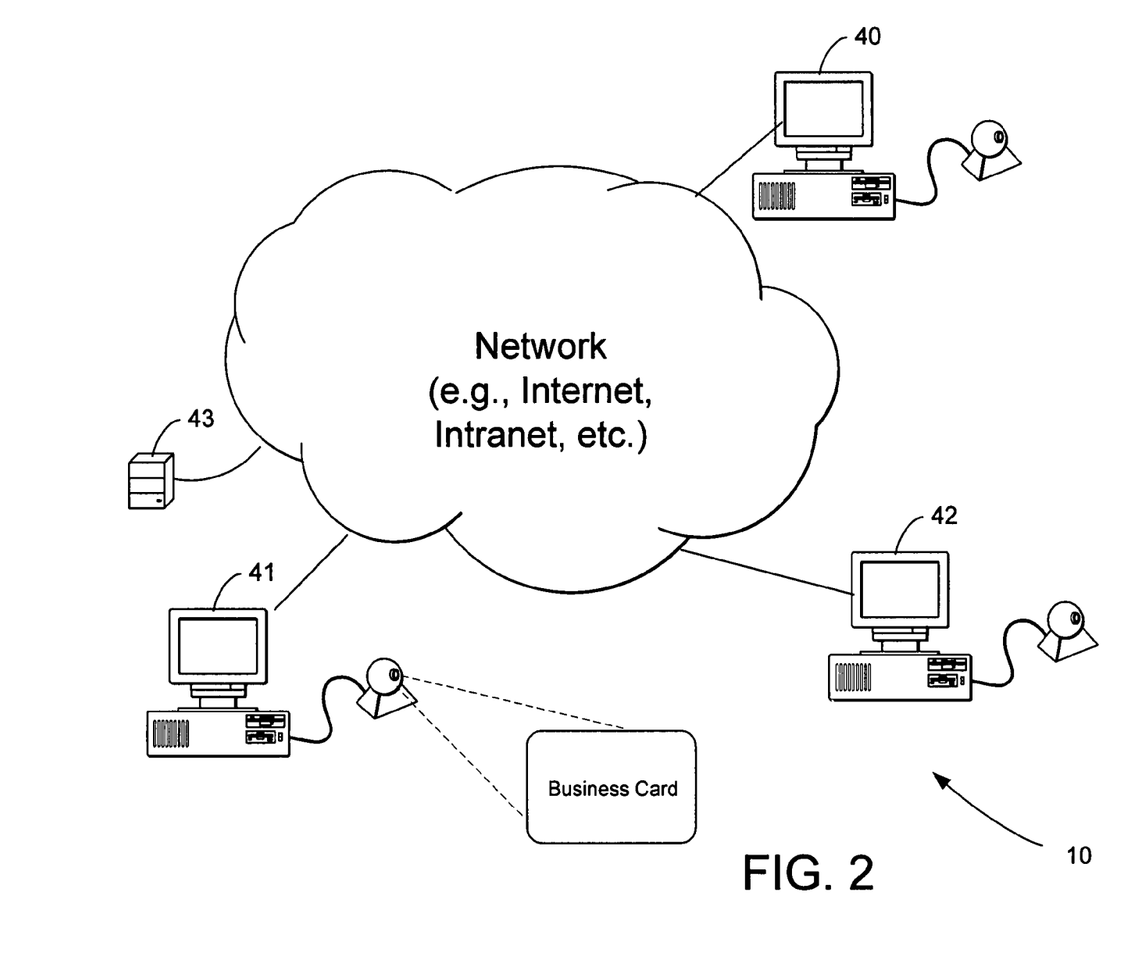
FIGS. 2 and 3 show an illustrative embodiment of the present invention.
Figure 3:
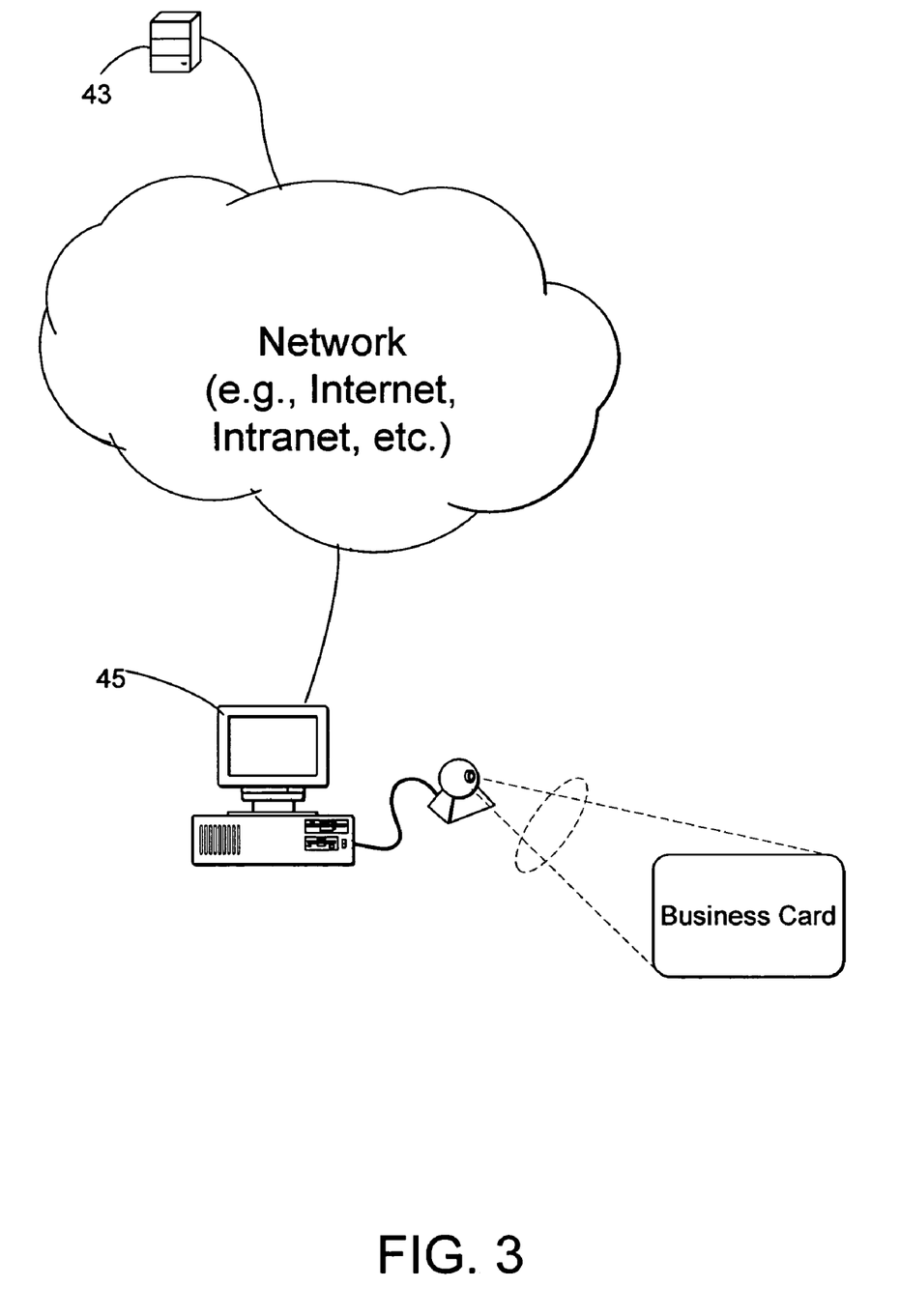

FIG. 2 illustrates system 10, including a plurality of user terminals 40, 41 and 42, and a central site 43. The user terminals 40, 41 and 42 communicate with the central site 43 via a network, such as an internet, intranet, dedicated network, WAN, LAN, wireless network, etc. Of course, the user terminals 40, 41 and 42 may be adjacently located, or may be located remotely with respect to one another. For example, a first user terminal 40 may be located in an office or business, while a second user terminal 41 may be located in a residence. The third terminal 42 may even be a remote terminal, which gains access to the network via a wireless connection, remote connection, guest connection, etc. Of course, system 10 will typically include many more user terminals, and may even include a plurality of distributed servers, which collectively function as central site 43. If a plurality of distributed servers is employed, the servers can communicate to synchronize their data. Preferably, with such a distributed server configuration, each distributed server may respond to individual requests.

Preferably, each of the user terminals 40, 41, 42 includes a general purpose or dedicated computer incorporating at least a CPU, memory, interface to an input device (e.g., web camera, business card reader, optical scanner, other sensing device, etc.), a display (or other output device), and a network connection. The network connection may be used to connect to the network to communicate with central site 43.

Of course, a user terminal may comprise a portable computing unit, such as a personal financial assistant, portable phone, wireless imaging device, PocketPC, PalmPilot, PDA, etc., with associated imaging components and/or wireless, cable, phone or other networking ability. To illustrate, such units may include a miniature digital camera module, e.g., a "digital eye" or other input sensing device. Such an input sensing device enables mobile or portable devices to capture, display and transmit digital data (audio, images, video). The "digital eye" modules typically include a complete camera on a chip, CMOS imaging sensor, miniaturized lens, imaging software, etc.

Suitable client software programming instructions, stored in a user terminal memory, or in a remote memory, can be used to affect various types of functionality for the user terminals 40, 41 and 42. For example, the software may include a browser or other internet navigation tool. Alternatively, the software may be a separate module or may be integrated within a software application. In either case, the software instructions help to facilitate communication between the respective user terminal and the central site 43. The user terminals 40, 41 and 42 preferably include software instructions to facilitate detection and decoding of embedded data.

Central site 43 includes a computer or server (or a plurality of interconnected servers). As will be appreciated by those skilled in the art, these computers maintain and execute software, e.g., for hosting (and/or supporting) web pages, communication, database management, etc. Site 43 also maintains suitable software program instructions to facilitate the system operations described herein. Of course, system 43 may include a plurality of distributed central sites and a database (or databases). The database may be maintained under the direction of the central site 43, or may be remotely accessed by the central site 43.

A user (e.g., a card-giver) initiates a registration process by accessing a website or other interface supported by central site 43, e.g., with the aid of an interface residing on a user terminal 40, 41 or 42. The interface may include a dialog box, web browser, application, and/or other communication mechanism. The central site 43 maintains a series of web pages (or other interface) to facilitate the registration process. From a user's perspective, a first-time user initially registers with the central site 43. The registration process may include gathering the user's contact information, selecting payment options (e.g., credit card, on-line exchange, etc.), and optionally assigning a user name (or ID) and password. As a result of the registration process, the user is assigned a unique identifier. (Of course, this assignment may either be perceptible or imperceptible to the user. Such an assignment will typically be associated the user (and/or username/password) with the unique identifier.). The unique identifier is typically embedded by the central site 43 in a gallery item to be provided to the user, along with an address (e.g., a URL, IP address, and/or UID) associated with the central site 43.

Preferably, the central site 43 maintains a plurality of gallery items including, for example, patterns, colors, graphics, shading, tints, backgrounds, logos, fonts, etc. Via the central site 43 interface, a user selects a gallery item (or items) to be applied when printing a business card. The selected gallery item is then digitally watermarked. The watermark includes the user's unique identifier and may include the central site's address (in some applications, the central site's address is known to the decoding software without being specified on the card, or is inferred by the decoder from the identifier, e.g., identifiers in the range of 3000-5000 are directed to www.digimarc.com/bizcards). The selected, watermarked gallery item is provided to the user, e.g., via e-mail, downloaded, etc., from the central site 43.

The selected, watermarked gallery item is then used in a typical printing process. For example, a watermarked background item is used as a card's background when printing a business card. Consider the following applications. A watermarked background item is provided for use with printing software (e.g., Quark Express, Microsoft Word, Adobe Acrobat, etc., etc.). The software incorporates the background item in a particular custom business card design. The resulting cards are printed (e.g., from a home computer system or commercial printer). Alternatively, an electronic version of the watermarked background item is supplied to a commercial printer (e.g., copy store, office supply store, printer, etc.). The printer applies the watermarked background to the card during the printing processes. The resulting business cards include the watermarked background.

Preferably, the user provides information to an on-line informational database, associated with the central site 43. This process may occur during the initial registration process via the web pages or user interface. Or the user may later access the database with a username/password. As a further alternative, the user is provided with access data that is used to access the database. The access data may include embedded data having appropriate identifiers and authorizations, and may even be embedded into a document, such as a "master" business card or other item (e.g., a watermarked driver's license, or key chain). The master business card can then be read by a compliant reader (e.g., a user terminal), which uses the embedded data to access the database or user interface. In one embodiment, central site 43 maintains the database. In another embodiment, central site 43 links (or provides redirection data) a user and/or card recipient to a remotely accessed database.

Upon access to the on-line database, the user may enter data. The data may include business contact information, personal data, current (or "now") contact numbers, etc. This now contact number can be continually updated throughout the day (either by the user, or in accordance with a programmed calendar) with the then-most-suitable communications channel to contact the user (card-giver). When the user leaves home to go to the office, or leaves the office for a trip in the car, or works a week at a corporate office in another town, etc., this data field can be updated accordingly. (A pocket GPS receiver, with a wireless uplink, can be carried by the person to aid in switching the "now" number among various possibilities, depending on the user's instantaneous position.). The now number may also include an "Out-of-Office" or a "currently-unavailable" setting, which allows a user to indicate that they are away from the office. Such a setting may also include redirection information, such as when the user will return, whom to contact in the user's absence, etc. When this on-line database is polled for the "now" number, it provides the then-current information.

The user data can also include pictures, résumés, corporate or personal web links, graphics, PDF versions of brochures, logos, etc. Of course, this information may be updated as needed. Optionally, the user provides audio/visual data, such as audio and/or video clips (e.g., digital files). The clips may include greetings, further information, contact information, personalized messages, virtual tours, mission statements, etc. Alternatively, the user may enter pointers or links to such audio/visual data. As a further alternative, system 10 may allow a user to input a "redirect" address (e.g., a URL), which is then associated by system 10 with the user's unique identifier. System 10 then redirects any card-recipients to the redirect address when selected (or automatically upon access to the central site 43). Of course, the user can turn on/off the redirect address, and/or update the redirect address as needed.

The system may optionally support translation and/or pronunciation tools. To illustrate, the central site 43 may optionally allow a registered user to provide an audio and/or video clip to demonstrate the correct pronunciation of their name, business and/or other personal data to card recipients (or other persons who gain access). The system may also optionally include automated translation and pronunciation functionality (e.g., audio synthesis, wave files, digital speech, etc.), which can be provided to a card recipient.

Watermarked business cards are distributed in a typical fashion. After receipt, a card recipient presents the embedded card to an associated input device of a recipient's terminal 45, as shown in FIG. 3. (Of course, a recipient's terminal 45 may include components and software like those discussed above with respect to the user terminals 40, 41 and 42. In one embodiment, the user terminals may be used as a recipient terminal. Of course system 10 may include many such recipient terminals.). The embedded data is extracted by decoding software running on the recipient's terminal 45. Preferably, as discussed above, the extracted data includes the card-giver's unique identifier and, in some cases, an electronic address. In one embodiment, the address is a URL corresponding to the central site 43. In other embodiments, the recipient terminal 45 is provided with software that always looks to a programmed, default address. Or a protocol is established by which the decoder can locally look-up the identifier in a data structure and determine an address to which the identifier should be sent (e.g., identifiers in the range 3000-5000 are sent to www.digimarc.com/bizcards). The software interface (e.g., browser) is redirected to the address, and the extracted unique identifier is provided to the central site 43.

Upon receipt of a recipient's request, the central site 43 indexes the on-line database via the provided unique identifier. At this point, the card recipient can access the respective user's data via web pages (or other interface) supported by central site 43. Preferably, some or all of the user's data is electronically available (e.g., via download, e-mail, etc.) in a standardized format, such as in a vCard or ASCII file. The term vCard is used generally herein to include electronic files or standardized formats of digital information. In one example, a vCard is a standardized format which allows a card recipient to seamlessly incorporate the electronic data into her software appointment/contact manager, such as in Microsoft's Outlook application, etc. In another example, a vCard is a virtual card that includes a greeting, data or other message. A vCard may include a "hot" URL, which allows a card-recipient to link to the card-giver's website. (Instead of accessing the central site, presentation of the card can cause a remote computer to dispatch an e-mail to the card-recipient's terminal (e.g., addressed per e-mail address data transmitted to the central site with the card-recipient's request). This e-mail can contain the user information described above, or any of the information detailed below. Functionality detailed below can be invoked by a card-recipient through activating a hyperlink included in the e-mail sent to the card-recipient's terminal. Alternatively, instead of accessing the card-giver data in a database or website, presentation of the card can open an instant message dialog channel with the recipient (a channel which may convey video and audio, as well as text). Again, information and functionality described above and below can be presented to the card-recipient through this channel.

In another embodiment, a card-giver up-loads a vCard into the database, to help simplify data entry. The vCard can be uploaded in a number of know methods, including drag-and-drop, file transfer, cut-and-paste, copy, etc. Or an extension may be added to a software productivity manager, such as Microsoft's Outlook, to facilitate such transfer.

The card recipient may also select from a plurality of options provided by the central site 43. (Of course, the following options may be provided as standard or optional features.). As a first option, the recipient selects a contact channel for the respective user (card-giver). For example, an e-mail link may be selected, which will launch an e-mail program on the recipient's terminal. As another example, a "now" contact channel is selected and the card-giver's defined "now" channel is activated (e.g., a phone number is dialed, an e-mail application is launched, a video link is established, a pager number is called, a radio frequency channel is activated, a personal computing assistant is pinged, etc.). In one embodiment, a card-recipient leaves her own "calling card" in the form of a link (or vCard, message, etc.) to her own central-site (or other) account. For example, the card-recipient brings up the card-giver's account (in any of the methods discussed above), and then flashes (e.g., presents to an optical scanner or other input device) her own card. System 10 stores the link to the card-recipient's account (e.g., data associated with the card-recipient's unique identifier). An e-mail alert (or other communication) is automatically sent by system 10 to the card owner stating that a calling card has been left and can be picked up any time. The card-giver, upon access to system 10, can check a mailbox or recent message area to retrieve the message. Or the calling card, vCard, or link to the card-recipient's account can be included in the e-mail or other communications.

The central site 43 may support one or more "hot" buttons. A hot button is preferably a link or shortcut to a communications channel, website or IP address. For example, an e-mail hot button can be selected by a card-recipient, which launches an e-mail program. (In one embodiment, an e-mail program resident on the card-recipient's terminal is launched. In another, the e-mail program is maintained by central site, which the card-recipient interfaces with.). Selecting other hot buttons may invoke a phone call, video conference, fax, voice mail (e.g., calling a voice mailbox or recording and/or uploading an audio file for delivery to the card-giver), pager, and/or GPS locator.

A card recipient may select to listen or view the card-giver's audio/visual files, or to activate the translation and/or pronunciation files. Such files are transferred (or streamed) to the card recipient's terminal for performance via a multimedia player. Of course, such a player may be an independent application, or may be integrated with a browser or other tool. Alternatively, the card recipient selects a link to another location (via a pointer or link). The files are retrieved or accessed at this other location.

The card recipient may request that a "tickler" be sent when the respective card-giver updates her on-line data. There can be various levels of gradation to trigger such a tickle. For example, the recipient can be notified (e.g., via e-mail, phone-messaging, and/or mail, etc.) when a standard contact field (address, e-mail, etc.) is changed. Alternatively, the card recipient is tickled when any information changes, including the "now" contact number.

The card recipient may select an option to expedite contact with the card-giver in the future (e.g., the next time the card recipient holds the business card up to their compliant device). For example, the card recipient may request that instead of accessing the data in the on-line database, a contact channel be opened. To accomplish this, a cookie or other data structure may be stored locally on the recipient's terminal 45. The cookie or data structure identifies the user (via the user's unique identifier) and also the recipient (e.g., via an identifier or last-session identifier). Such data is provided to the central site 43 the next time the card recipient accesses the central site 43 via the recipient's terminal 45. The central site 43 examines the data and determines that, instead of viewing the user's data, the recipient wishes to activate a contact channel (e-mail, phone number, etc.). Optionally, the recipient is queried to confirm her choice (e.g., a dialog box which asks the recipient whether they want to access the database, or activate the communications channel.). Of course, locally storing extracted identifiers in an "immediate contact list," and then comparing a currently extracted user identifier to the immediate contact list can be used to carry out this same process. This same result is achieved by assigning the card recipient a username and/or password, which is examined by the central site 43. An immediate contact list can be associated with the username/password to determine access to the database, or to launch a communications channel.

A card-recipient may also register with the central site 43. Upon registration, the card-recipient is given a username/password (or is allowed to select such). (In another embodiment, the card-recipient is given embedded data, which is applied to a printed document or item.) The username/password (and embedded data) can be used to access the central site in the future. For example, if the card-recipient loses a business card, or does not have access to a respective, downloaded vCard, the card-recipient "logs-on" to the central site and searches for a particular name. (In this case, the central site supports a name search functionality using known database search/index techniques.). Permissions levels can be established to prevent a card-recipient from unauthorized perusing. To illustrate, a card-recipient may only access those files (e.g., card-giver accounts), which she has already accessed via an embedded business card. Or a card-recipient is only permitted access to a minimum level of information, such as name, contact number or e-mail.

System 10 generates many benefits, such as the ability to enhance functionality of business cards, change on-line data while static data on a business card remains the same, simplifying contact processes, and linking to related information. Centralizing the data in an on-line database also provides efficiency and security. These and other benefits are readily apparent from the description in this document.

ALTERNATIVE EMBODIMENTS

As an alternative implementation, a representative, administrator, or office supplier may handle the registration process, instead of the user. Such an administrator may represent a variety of users and have special access privileges. For example, a print shop or office supplier may contact the central site 43 on a user's behalf, to obtain a watermarked gallery item. Optionally, the print shop or office supplier may also to enter the user's data into the online database. Similarly, an organization or business may complete the registration process for its members or employees, and thereafter control database entry. Organizational control may be advantageous in that a position (e.g., purchasing agent, sales person, technical position) may be updated to reflect personnel changes, organizational restructuring, etc. Control can also be important to organizations, in that terminated employees can be removed from association with the company. Such control also allows a company to maintain brand and image control. For example, a highly "brand-sensitive" company may not want its employees to be able to add non-brand related content to the contact site. Accordingly, the company can control the content associated with an employee's unique identifier.

Whereas the above system implementation has been described with respect to business cards, the present invention is not so limited. In fact, many other watermarked documents may be used to accomplish the same functionality via the system 10 architecture. Consider envelopes, letterhead, note pages (e.g., Post-It brand notes) and stationary. A user may similarly register and obtain a gallery item to apply to such. A card recipient, upon receipt of these types of watermarked documents, presents the respective document to a compliant terminal in the manner discussed above. Access to the on-line data repository is similarly achieved. (Corporations too, may want to have these types of items linked to general contact or company information.).

Now consider a résumé. A potential employee may submit watermarked résumés to a plurality of potential employers. The potential employee adds impressive data to the linked on-line database, including, for example, audio or video clips, to be viewed by potential employers. A potential employee may even custom design the information for an individual employer by sending the employer a résumé embedded with a corresponding, specific unique identifier. The employer, upon access to the on-line data via the encoded resume, is greeted with specific and targeted data. (A business card may even replace a résumé, in that the bibliographic information is easily accessible on-line via the encoded business card.).

Encoded labels may also be used with system 10. For example, printed mailing/shipping labels may be encoded with an identifier, which is used to link to associated information (e.g., sender, addressee, corporate information, product information, etc.). Such an encoded label could be used with packaging to augment a shipping manifest, shipping label, product and handling instructions, etc. For shipments without external markings, the encoded label could provide a means to determine the package's content. Moreover, such an encoded label may be used to track a package throughout a distribution system.

Of course, other documents, such as stickers, brochures, appointment cards, etc. may be encoded in a similar manner, and implemented with system 10.

As a further alternative, a user need not select a gallery item, but may instead present her own document to be watermarked. The user's document itself is then embedded with data, which can then be reprinted. For example, a user presents a business card to an optical scanner. The optical scanner captures an electronic copy of the business card. The electronic copy is then watermarked (e.g., by subtle alterations to the text or graphics already present) and returned to the user for printing and distribution. (The watermarking may be accomplished via the central site 43, or via software maintained by a user terminal, which communicates with the central site 43 to assign or register a unique user identifier.). Of course the watermark survives the printing process, and is reproduced when the watermarked, electronic copy is printed. Since, a unique identifier is assigned to the user's document, the user may then access the on-line database for data entry associated with the unique identifier.

Similarly, a further embodiment allows a user to submit an electronic card image to a watermarking professional, who embeds the image with the unique identifier (and, optionally, with an electronic address). The watermarking professional can then either return the watermarked, electronic card image to the user or send the card image directly to a printer for printing. In this case, the professional preferably communicates (either before, during or after embedding) with the central site to facilitate the association of a unique user identifier with the user. Alternatively, upon an initial access to the central site, the identifier is extracted and registered, and the user is then permitted to enter data.

As even a further embodiment, system 10 supports a model wherein a professional designs a document (e.g., business card), potentially including artwork (e.g., graphics, text, shading, background, etc.), which document is specifically supportive of digital watermarks. The document is then watermarked with a unique identifier as discussed above.

In one embodiment, a card-recipient maintains a visual database of each card-giver accessed via the on-line database. To illustrate, a card-recipient, upon access to the on-line database, may download a visual icon (e.g., a digital image of the card-giver, a company logo, graphic, etc.) associated with a card-giver. The icons serve as a shortcut to the card-giver's data. The card-giver's data (e.g., vCard, unique identifier, perhaps encrypted for protections, and/or other data) may be stored locally, or may be accessed via the on-line database. Such icons may be stored in a file, folder, or on a computer's desktop environment.

A card-giver, in one embodiment, may choose to have her e-mail forwarded to the on-line database. (The database may manage the e-mail in an account associated with the card-giver's unique identifier.). The card-giver may then access the on-line database (e.g., via a her own watermarked business card or a master business card) to retrieve her e-mail. This allows a traveler to easily access her e-mail when on the road, upon the presentment of her business card to a compliant device. (Kiosks may be set-up, in airports, travel hubs, coffee shops, convention centers, offices, corporate sites, etc., to provide additional compliant devices for such travelers.).

The central site 43 and/or online database can be configured to allow a user to be associated with a plurality of different data sets. For example, a business card may include two unique identifiers, each of which triggers a separate response. A first identifier may be included on a front side of a business card, while a second identifier is included on the backside of the card. The first identifier links to business data, while the second identifier may link to personal data, corporate data, and/or industry data, etc. From the perspective of the database, the user may be assigned separate identifiers to accomplish the separate responses, or the identifiers may be linked as subsets to a user's main profile. Alternatively, a user may carry several differently watermarked cards, each linked to separate information in the on-line database.

Another variation included within the scope of the present invention is a distributed system. For example, instead of storing data in a central site (or a plurality of central sites), user data may be distributed or maintained in alternative locations. To illustrate, a card-giver may maintain related data (e.g., contact information, audio/video clips, links, etc.) on her own client system (or on a designated system). Software resident on a recipient or user terminal may then query a look-up router to obtain an appropriate address (e.g., one corresponding to the extracted unique identifier) to access for the card-giver's related data. (In this case, a user may initially query the look-up router to obtain an appropriate unique identifier. In one embodiment, the user's address is the unique identifier.). Upon receipt of the address, the software accesses to the indicated site (or terminal). As a further alternative, the watermark itself includes sufficient encoded address information so that the decoding software (and/or communications software) can link to the client system without needing to query a central site or look-up router. (In this case, the user's address may serve as a unique identifier, which can be embedded by client software on the user's terminal.). Of course, such modifications are within the scope of the present invention.

CONCLUSION

The reference to business cards is illustrative only. Of course, the invention is more widely applicable. Going back a century, "calling cards" were used by persons whose interests were strictly social, rather than business. The principles of the present invention can similarly be applied. Teenagers can carry small cards (or adhesive stickers) that can be exchanged with new acquaintances to grant access to private dossiers of personal information/favorite music/artwork/video clips/etc., to invoke instant message communications, or any other purpose. The cards can be decorated with art or other indicia that can serve purposes wholly unrelated to the linking data steganographically encoded therein. Additionally, a calling card may even be blank (e.g., no text or obvious graphic), while still carrying encoded data in the background, texturing, or shading. Or the card may have a one word identifier or graphic to identify the card-giver.

Even the "card" paradigm is too restrictive. The same techniques can be applied to any object. A music CD cover can be encoded to point to a promotional site associated with the music artist. A book jacket can link to a similar site. Printed advertising distributed through the US mail (cards, magazines, etc.) can be encoded to point to related web-based promotional sites. (Sponsors of such advertising or other sites can reward visits to their internet site by issuing card recipients digital tokens or coupons that can be redeemed for premiums, cash-back, etc., either for any such visit, or only if the visit was effected through the portal of a steganographically-encoded printed medium.).

Many contexts arise in which data to be presented to a consumer is valuable only if timely. The postal service mail is ill-suited for some such information due to the latency between printing a document, and its ultimate delivery to a recipient. The principles of the present invention allow the recipient to take a steganographically-encoded data object (card, etc.) that was printed well before delivery, and use it on receipt to receive up-to-the-minute information. (In this and other embodiments, the steganographically-encoded data can also include data uniquely identifying the recipient/user, so the web site can present data customized to that user.)

The present technology also has application in access control systems. An identification badge (either with photo or graphics, or with text alone) can be encoded with steganographically access control data (e.g., access codes or digital keys) that is recognized by optical-scanner-equipped locks and the like, permitting access by authorized persons to restricted areas or restricted services (e.g., computer privileges). Given the low cost of media and printing (as compared with other access control technologies), the cards can be issued on a daily, weekly, or other frequent interval, and the access control system can be programmed to permit access in response to such cards only for the pre-set limited period. Lost cards soon lose their threat.

Tickets to sporting events, concerts, and other events can be steganographically encoded to permit the bearer to access premium web content available only to those who have purchased tickets (e.g., an on-line text-, audio-, or video-chat session with the featured performer or sports star the day before the event). Alternatively, the encoded data may link to a transactional site. In some such embodiments, the ticket is printed with a nominal show data and seat assignment, but also includes a UID in addition to the encoded address of an associated transactional ticket site. The user then can visit the transactional web site to change seating (or date). On attending the event, the consumer presents the ticket to a steganographic decoder apparatus that discerns the UID and looks up the seat assignment most-recently picked by the consumer. It then prints a chit entitling the consumer to take the seat earlier selected on-line.

The reference to "scanning" of objects naturally brings to mind images of desktop flatbed scanners, or multi-function hydra devices. While such devices can be used—together with convention digital cameras (including video cameras)—the inventors foresee that image input devices will soon be much more commonplace. The provision of digital cameras as built-in components of certain computers (e.g., the Sony Vaio laptops) is just one manifestation of this trend. Another is camera-on-a-chip systems, as typified by U.S. Pat. No. 5,841,126 and detailed in Nixon et al., "256×256 CMOS Active Pixel Sensor Camera-on-a-Chip," IEEE J. Solid-State Circuits, Vol. 31(12), pp. 2046-2051 (1996), and Fossum, "CMOS Image Sensors: Electronic Camera-on-a-Chip," IEEE Transactions of Electron Devices, vol. 44, No. 10, October 1997. Still another is head-mounted cameras (as are presently used in some computer-augmented vision systems). Another is a camera module for mobile phones that use a CCD image sensor. Such camera often feature low electric power consumption, and high sensitivity. Another is a wristwatch with an image sensor. These and other image input devices could all be used in connection with the present invention.

To facilitate embodiments of the present invention, a prior art camera-on-a-chip system can be modified to also include a steganographic watermark detector on the same semiconductor substrate. Such a chip—in addition to providing image output data—can also analyze the image data to discern any steganographically encoded data, and produce corresponding output data. (Again, such analysis desirably includes correction for scale and rotation factors, so precise positioning of the object being "read" is not essential for correct decoding.).

To provide a comprehensive disclosure without unduly lengthening this specification, applicants incorporate by reference the patents, applications, and publications identified above.

Having described and illustrated the principles of our invention with reference to illustrative embodiments, it should be recognized that the invention is not so limited.

For example, while certain of the embodiments were illustrated with reference to an internet-based embodiment, the same techniques are similarly applicable to any other computer-based system. For example, the central server does not necessarily need to be on the internet. Within a company, such central site may be available via an intranet or other network. Watermark documents or objects (e.g., an ID or security badge) may be used for access to specific documents or access to specific locations or services within the company's facilities. Also, for internet-based embodiments, the use of web browsers and web pages is not essential; other digital navigation devices and other on-line data repositories can be similarly accessed.

While steganographic encoding of the digital data is used in the preferred embodiments, visible forms of digital encoding—such as bar codes or alphanumeric codes—can naturally be employed where aesthetic considerations permit.

Although not belabored, artisans will understand that the registration, watermarking, detecting and other operations can be performed in accordance with software instructions stored in a computer memory (or library) or on other storage media, and executed by a processor in the computer as needed. (Alternatively, dedicated hardware, or programmable logic circuits, can be employed for such operations.).

The above section headers (e.g., "System Implementation") provide no substantive limitations. Rather, the section headers are merely provided for the reader's convenience. Of course, elements discussed in one section can be combined with those in another section, and so forth.

In view of the many embodiments to which the principles of our invention may be applied, it should be recognized that the detailed embodiments are illustrative only and should not be taken as limiting the scope of our invention. Rather, we claim as our invention all such embodiments as fall within the scope and spirit of the following claims, and equivalents thereto.

What is claimed is:

1. A method comprising:
   receiving a request to register with an online computer;
   receiving account holder information to register with the online computer;
   establishing an account using at least the account holder received information including establishing a user-login that is associated with the account;
   allowing an account holder to select a graphic or image from a gallery of graphics or images maintained by the online computer, wherein a selected graphic or image becomes a representation that is associated with the account or user-login; and
   providing a selected graphic or image from the online computer as a representation of association with at least one of the account holder, account or user-login, a provided selected graphic or image comprises digital watermarking.

2. A method comprising:
   receiving a request to register with an online computer;
   receiving account holder information to register with the online computer;
   establishing an account using at least the account holder received information including establishing a user-login that is associated with the account;
   allowing an account holder to select a graphic or image from a gallery of graphics or images maintained by the online computer, wherein a selected graphic or image becomes a representation that is associated with the account or user-login, a selected image or graphic is associated with the account or user-login through a unique identifier steganographically embedded in the selected image or graphic; and
   providing a selected graphic or image from the online computer as a representation of association with at least one of the account holder, account or user-login.

3. The method of claim 1 wherein the user-login comprises a password and username.

4. The method of claim 1 wherein the online computer comprises a distributed system.

5. The method of claim 1 wherein receiving account holder information comprises wireless communication.

6. A method comprising:
   receiving a request to register with an online computer;
   receiving account holder information to register with the online computer;
   establishing an account using at least the account holder received information including establishing a user-login that is associated with the account;
   allowing an account holder to do at least one of:
   i. select a graphic or image from a gallery of graphics or images maintained by the online computer, wherein a selected graphic or image comes a representation that is associated with the account or user-login; or
   ii upload a graphic or image, wherein an uploaded graphic or image becomes a representation that is associated with the account or user-login; and
   providing at least one of i. a selected graphic or image, or ii. an uploaded graphic or image from the online computer as a representation of association with at least one of the account holder, account or user-login, a provided graphic or image comprises digital watermarking.

7. A method comprising:
   receiving a request to register with an online computer;
   receiving account holder information to register with the online computer;
   establishing an account using at least the account holder received information including establishing a user-login that is associated with the account;
   allowing an account holder to do at least one of:
   i. select a graphic or image from a gallery of graphics or images maintained by the online computer, wherein a selected graphic or image comes a representation that is associated with the account or user-login; or
   ii upload a graphic or image, wherein an uploaded graphic or image becomes a representation that is associated with the account or user-login;

a selected or uploaded image or graphic is associated with the account or user-login through a unique identifier steganographically embedded in the selected or uploaded image or graphic; and providing at least one of i. a selected graphic or image, or ii. an uploaded graphic or image from the online computer as a representation of association with at least one of the account holder, account or user-login.

8. The method of claim 6 wherein the user-login comprises a password and username.

9. The method of claim 6 wherein the online computer comprises a distributed system.

10. The method of claim 6 wherein receiving account holder information comprises wireless communication.

11. A computer readable medium comprising instructions or circuitry to perform the method of claim 1.

12. A computer readable medium comprising instructions or circuitry to perform the method of claim 2.

13. A computer readable medium comprising instructions or circuitry to perform the method of claim 6.

14. A computer readable medium comprising instructions or circuitry to perform the method of claim 7.

* * * * *